(No Model.)
J. M. DODGE.
GATE FOR CONVEYER TROUGHS.
No. 485,913. Patented Nov. 8, 1892.
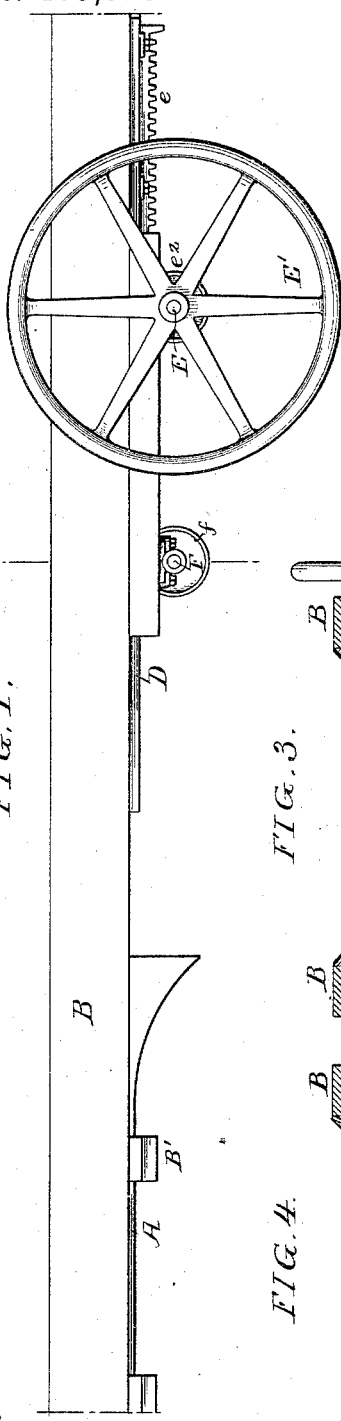
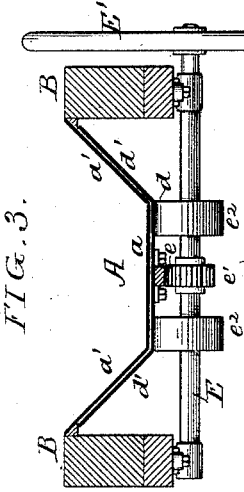
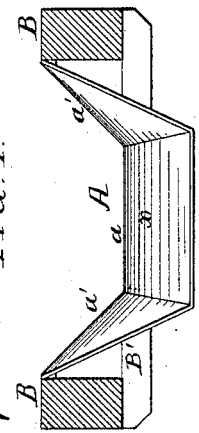
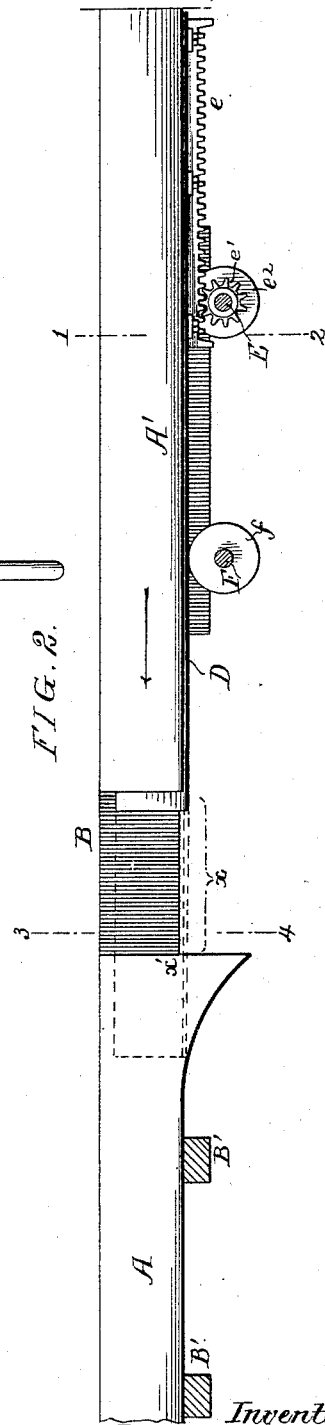
Witnesses:
Hamilton D. Turner
A. V. Groupe
Inventor:
James M. Dodge
by his Attorneys
Howson & Howson

UNITED STATES PATENT OFFICE.

JAMES M. DODGE, OF PHILADELPHIA, PENNSYLVANIA, ASSIGNOR TO THE LINK-BELT ENGINEERING COMPANY, OF SAME PLACE.

GATE FOR CONVEYER-TROUGHS.

SPECIFICATION forming part of Letters Patent No. 485,913, dated November 8, 1892.

Application filed August 31, 1892. Serial No. 444,642. (No model.)

*To all whom it may concern:*

Be it known that I, JAMES M. DODGE, a citizen of the United States, and a resident of Philadelphia, Pennsylvania, have invented certain Improvements in Gates for Conveyer-Troughs, of which the following is a specification.

The object of my invention is to provide a conveyer-trough with a gate or door which is simple in construction and which can be readily operated without intefering with the movements of the conveyer.

In conveyer-troughs for conveying material in bulk—such as coal, grain, and like materials—openings are provided in the bottom of the trough, and these openings are closed by gates so that the operator can open any one of these gates and allow the material to flow through any one of the openings to the point required; but it often occurs in the usual construction that the gates are so constructed that the flights strike portions, either of the gates or the edges of the openings, in their passage over the conveyer-trough, or the goods are so carried that only a small opening can be made.

In the accompanying drawings, Figure 1 is a side view of sufficient of a conveyer showing my improvement. Fig. 2 is a longitudinal sectional view. Fig. 3 is a transverse sectional view on the line 1 2, Fig. 2. Fig. 4 is a transverse sectional view on the line 3 4, Fig. 2.

A is the trough composed of a series of sheet-metal plates, shaped as shown in cross-section, having a bottom portion $a$ and inclined side portions $a'$; but other forms of troughs may be used without departing from my invention. These plates are mounted on suitable standards B, either of wood or metal, running the full length of the trough. Each plate is secured to the standards at the upper edges by spikes or other fastenings, and at intervals throughout the trough are transverse supporting-bars B', which pass under the troughs, as clearly shown in Figs. 2 and 4.

The conveyers which I prefer to use with the trough are composed of chains or ropes, and a series of flights which carry the material before them, preferably in the direction of the arrow, Fig. 2, so as to avoid any edges or projections on the trough. At intervals throughout the length of the trough are openings $x$. The plates of the trough on one side of the opening terminate abruptly at $x'$, while the plates on the opposite side of the opening are shaped to form a bell-mouth, as shown. This bell-mouth is not so much for the purpose of directing the material from the trough as it is to guide the gate as it is closed to its proper seat.

Directly under the portion A is a gate D. This gate has a bottom $d$ and sides $d'$, thus conforming to the shape of the trough. On the under side of the gate is secured a rack which engages with a pinion $e'$ on a shaft E, mounted in suitable bearings attached to the side frames B. On the shaft is a suitable hand-wheel E', by which the operator can open or close the gate by simply turning the wheel. Carried by the shaft are supporting-wheels $e^2$, which support the gate at the rear end. The front end of the gate is supported on wheels $f$, mounted on the shaft F, adapted to bearings hung to the side frames. Thus the gate is supported and retained close to the under side of the trough, and by simply turning the wheel in one direction the gate can be moved toward and into the bell-mouth of the trough, as shown clearly in Fig. 2. If the gate would sag or bend, owing to rough usage, the bell-mouth would always bring the gate up to its original position, as it is sufficiently inclined for that purpose, and the blades as they pass over the gate will not be caught by a projecting edge at the point where the gate abuts the trough.

I claim as my invention—

1. The combination, in a gate for a conveyer-trough provided with an opening, the trough at one side of the opening being shaped in the form of a bell-mouth, with a longitudinal movable gate adapted to pass into the bell-mouth and means for operating the gate, substantially as described.

2. The combination, in a conveyer-trough having an opening therein, with a longitudinally-movable gate mounted under the trough, means for supporting the gate thereunder, a rack on the gate, a shaft, a pinion on said shaft engaging with the rack, and a hand-lever by which the gate is opened or closed, substantially as described.

In testimony whereof I have signed my name to this specification in the presence of two subscribing witnesses

JAMES M. DODGE.

Witnesses:
HENRY HOWSON,
JOSEPH H. KLEIN.